Oct. 18, 1938.  L. V. WHISTLER ET AL  2,133,932
MACHINE FOR ASSEMBLING FINS AND TUBES
Filed Jan. 10, 1936    9 Sheets-Sheet 6
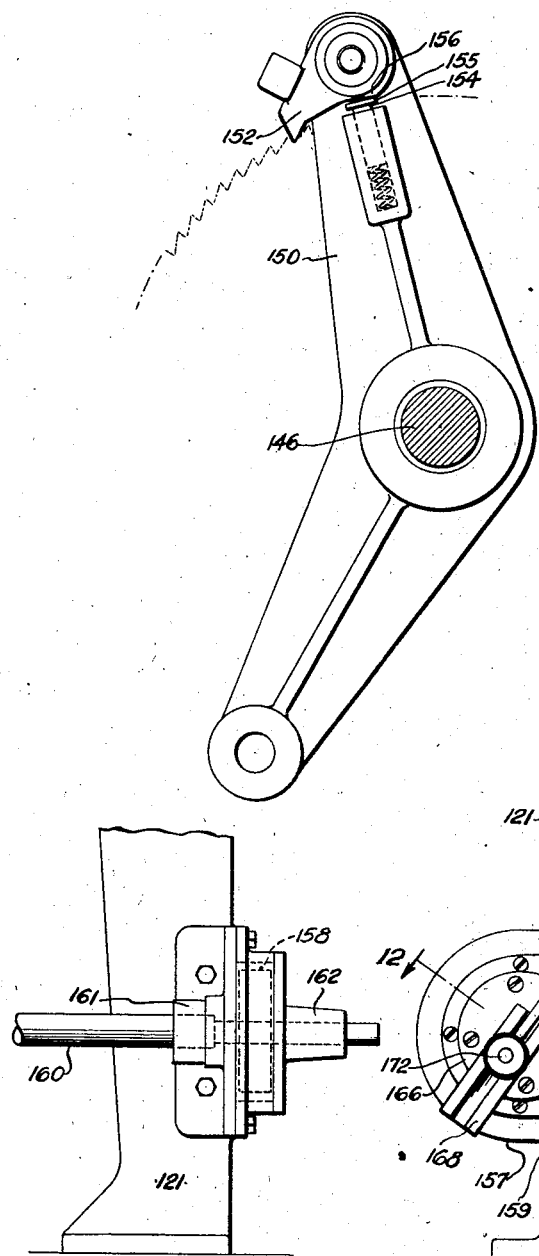
FIG. 11
FIG. 10
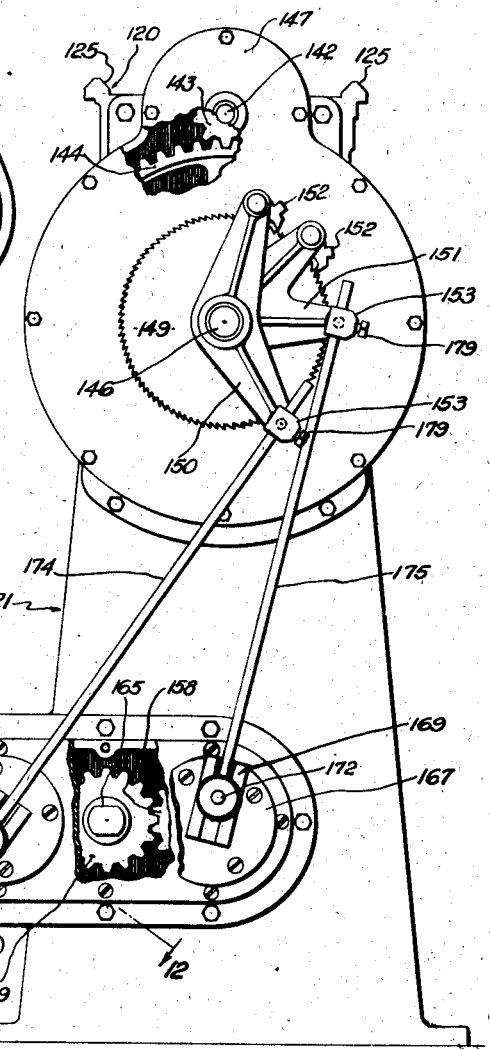
FIG. 9
Inventor
Lawrence V. Whistler
William H. Saabye
William E. Tingler
Albert R. Henry
Attorney Oct. 18, 1938.   L. V. WHISTLER ET AL   2,133,932
MACHINE FOR ASSEMBLING FINS AND TUBES
Filed Jan. 10, 1936   9 Sheets-Sheet 7

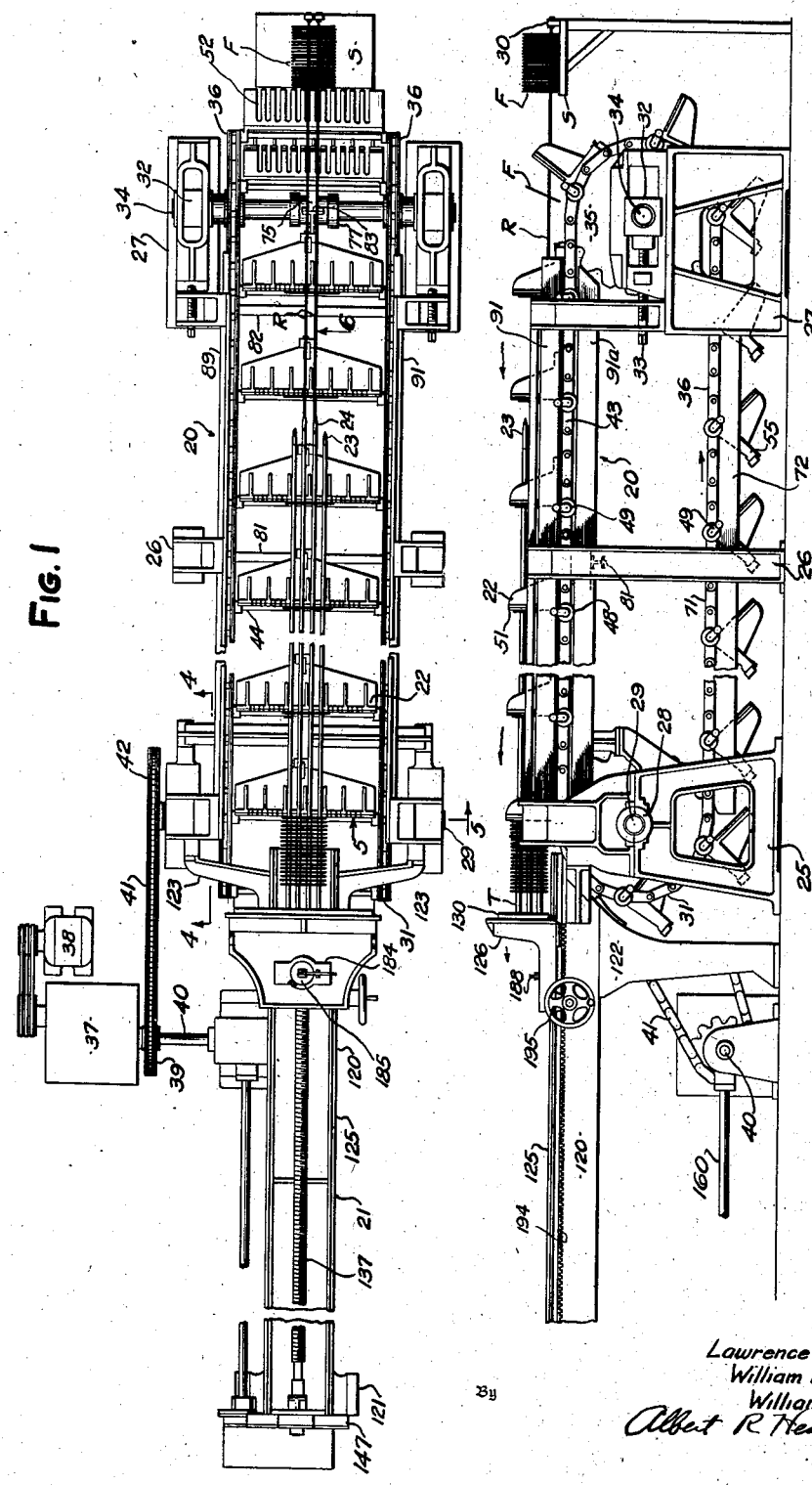

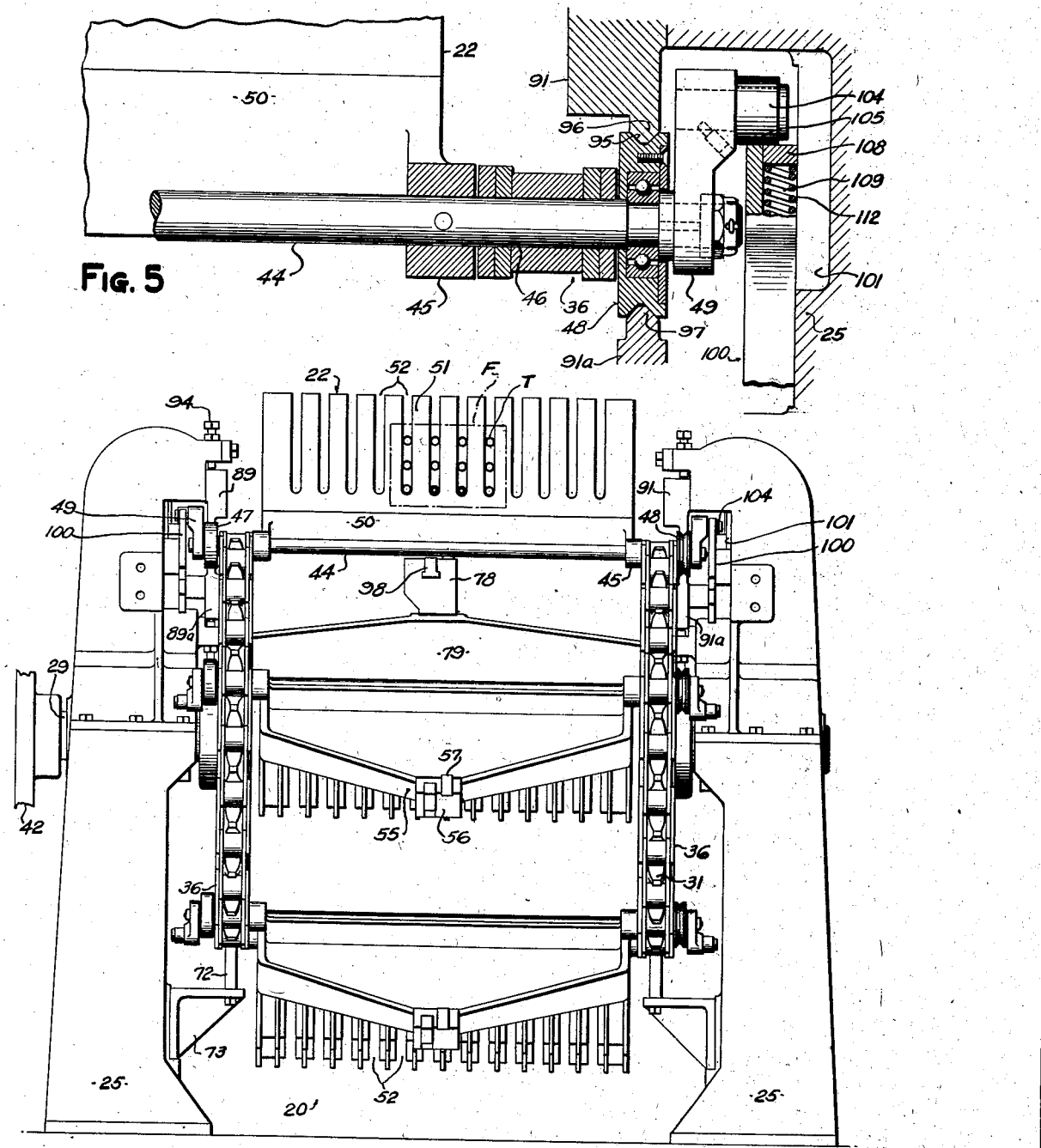

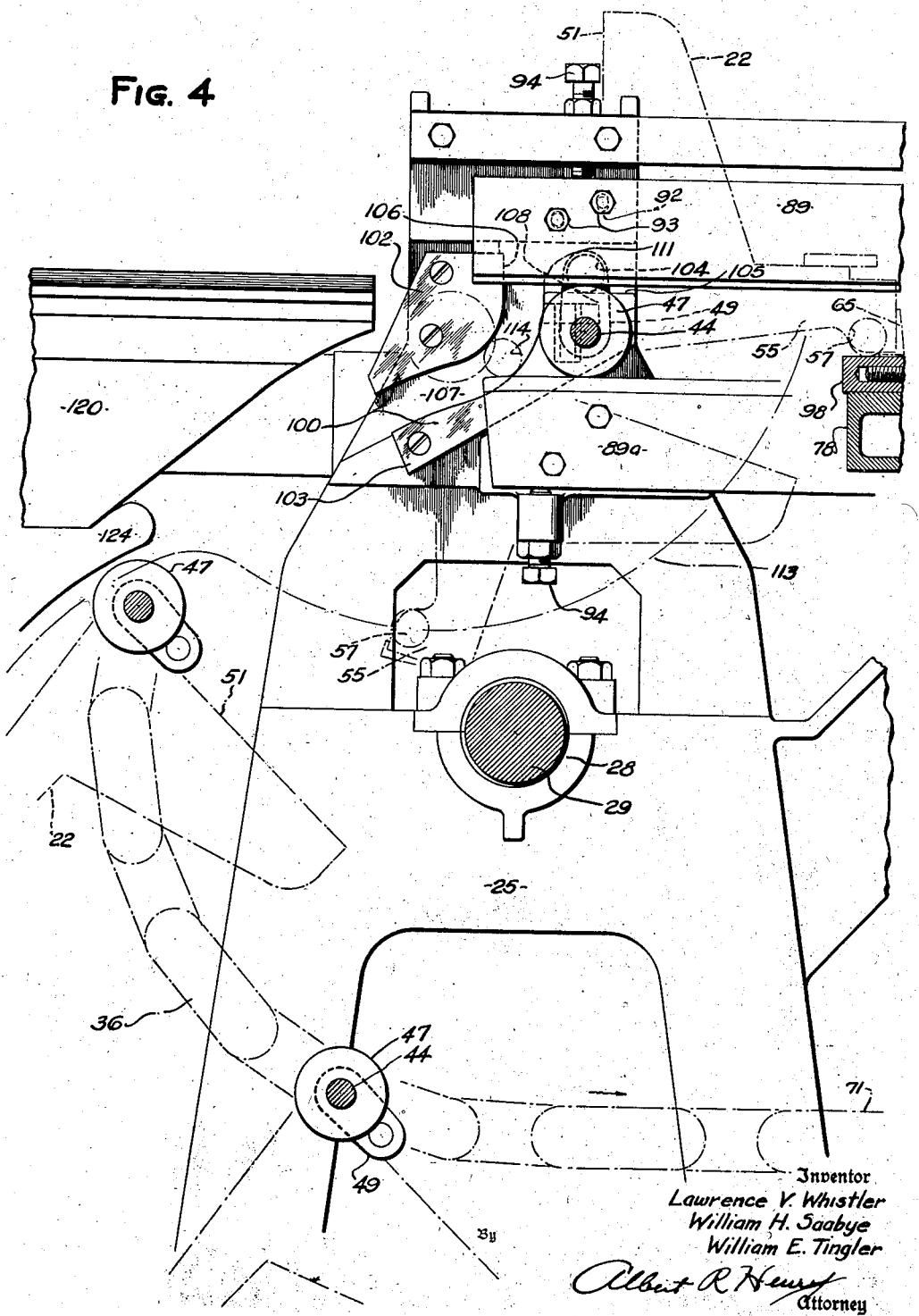

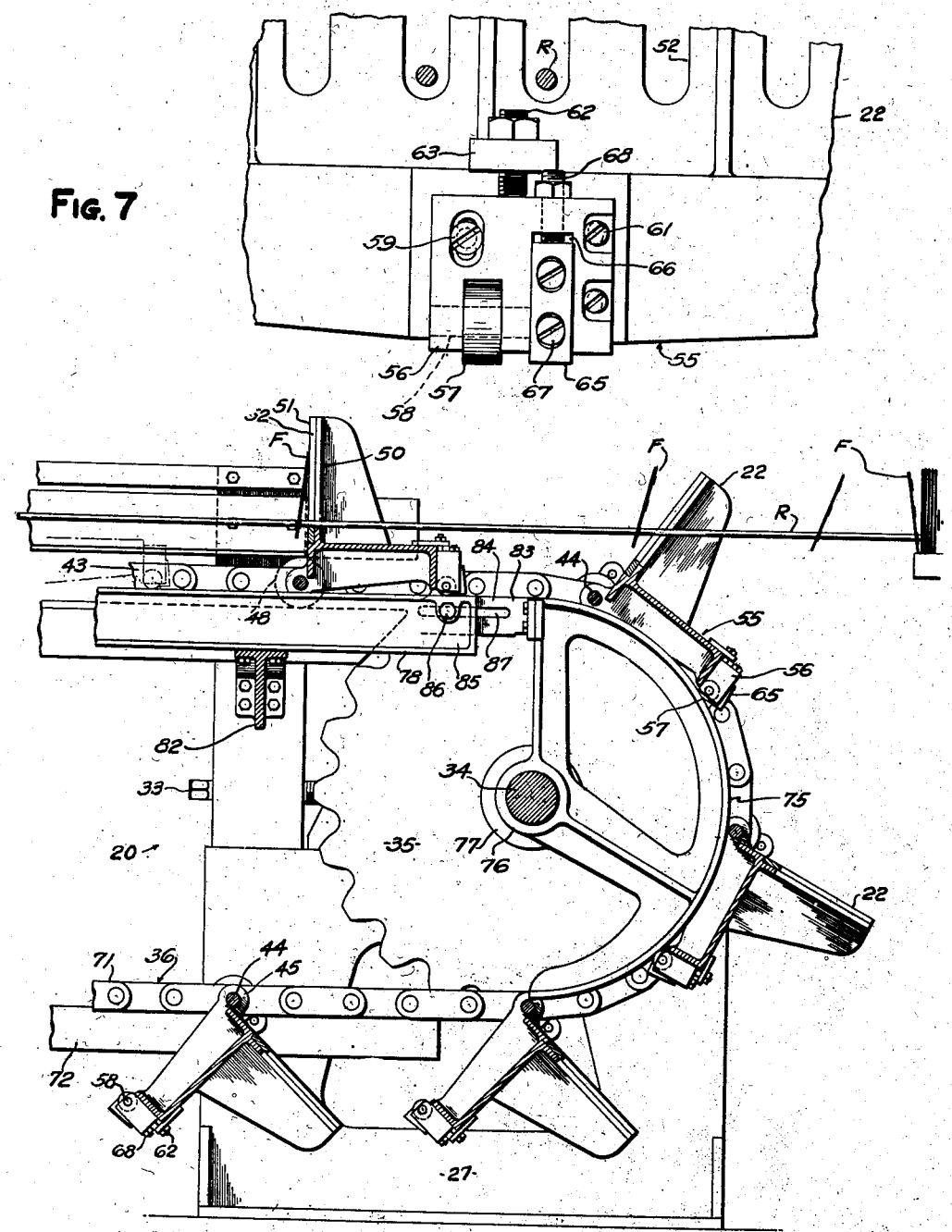

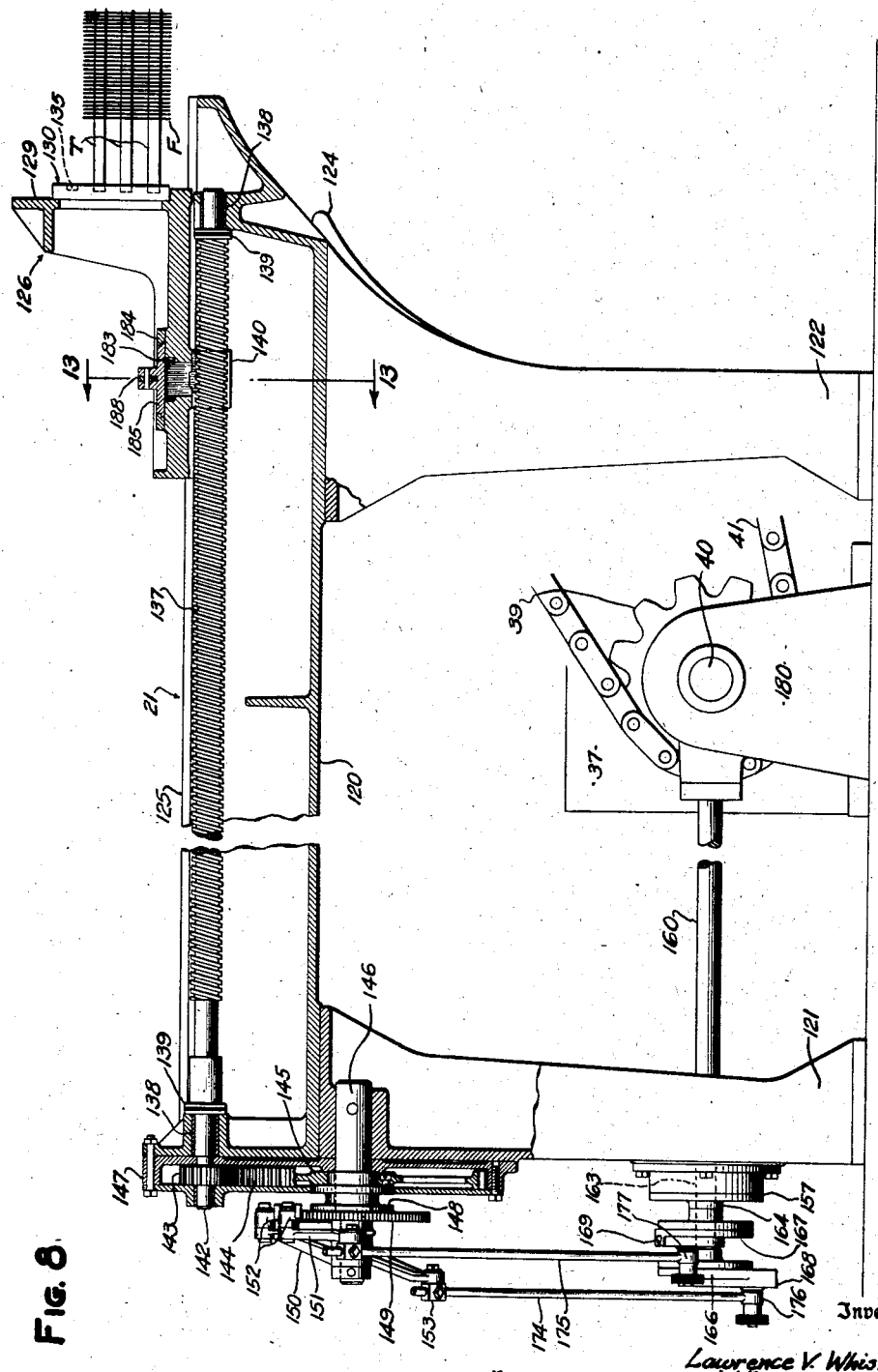

Inventor
Lawrence V. Whistler
William H. Saabye
William E. Tingler
Albert R. Henry
Attorney Oct. 18, 1938.   L. V. WHISTLER ET AL   2,133,932
MACHINE FOR ASSEMBLING FINS AND TUBES
Filed Jan. 10, 1936    9 Sheets-Sheet 9
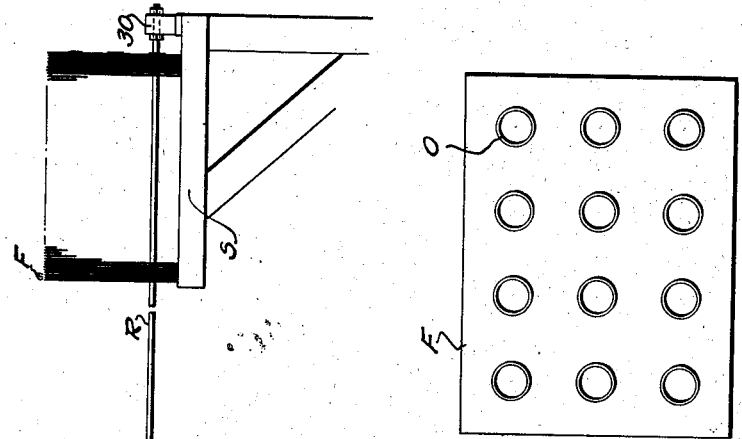
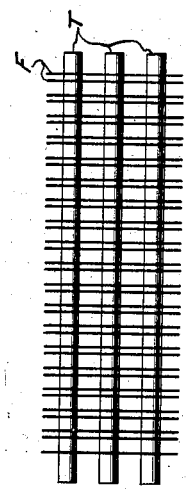
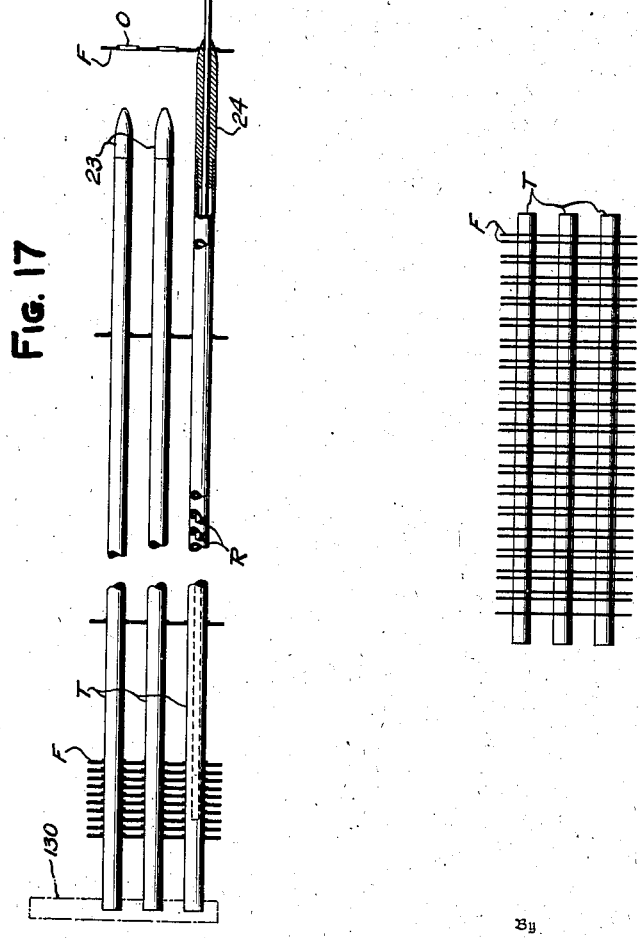
Inventor
Lawrence V. Whistler
William H. Saabye
William E. Tingler
By Albert R. Henry
Attorney Patented Oct. 18, 1938

2,133,932

UNITED STATES PATENT OFFICE 2,133,932

MACHINE FOR ASSEMBLING FINS AND TUBES

Lawrence V. Whistler, Kenmore, and William H. Saabye and William E. Tingler, Buffalo, N. Y., assignors to Fedders Manufacturing Company, Inc., Buffalo, N. Y.

Application January 10, 1936, Serial No. 58,498

7 Claims. (Cl. 29—84)

This invention relates to a machine for assembling fins and tubes in fixed relation to provide coil banks which may be utilized for a variety of purposes in the refrigeration and heating arts.

The invention more particularly relates to the fabrication of coils of the cross fin type, wherein rectilinear fins are positioned transversely on the tubes in resilient engagement to provide structural and thermal cooperation therebetween.

The machine is devised so that the fins are continuously moved, and, during their conveyance, they are successively applied to the tubes, which remain stationary except for an intermittent retrogressive action which determines the spacing of the fins. This action is accomplished by the provision of a novel continuous conveying mechanism for the fins, which, in cooperation with an effective feed or loading device, permits the production of coils of any commercial size, with the attention of but a single operator.

Another feature of the invention resides in an adjustable mechanism for varying the spacing of the fins to any desired degree, either in uniform or staggered relation.

The more specific features of the invention, including various adjustable means for insuring precision of the fin assembly, are completely set forth in the accompanying specification and drawings, wherein:

Fig. 1 is a plan view of the machine.

Fig. 2 is a side elevation thereof.

Fig. 3 is an end elevation of the cam end of the fin applying unit.

Fig. 4 is an enlarged fragmentary section on the line 4—4 of Fig. 1.

Fig. 5 is an enlarged fragmentary section on the line 5—5 of Fig. 1.

Fig. 6 is a section on the line 6—6 of Fig. 1.

Fig. 7 is an enlarged end elevation of the tail portion of a conveyor carriage.

Fig. 8 is an enlarged side elevation of the tube positioning unit with portions shown in section.

Fig. 9 is an end elevation of the tube positioning unit with portions of the gear housing broken away to show the drive mechanism.

Fig. 10 is a fragmentary side elevation of the drive end of the tube positioning unit.

Fig. 11 is an enlarged elevation of one of the bell cranks of the ratchet mechanism.

Fig. 16 is a front view of a fin.

Fig. 17 is a diagrammatic side elevation of a finned coil wherein the fins are regularly spaced on the tubes in accordance with the machine setup shown in the drawings.

Fig. 18 is a side elevation of a finned coil having irregularly spaced fins.

Figure 15:
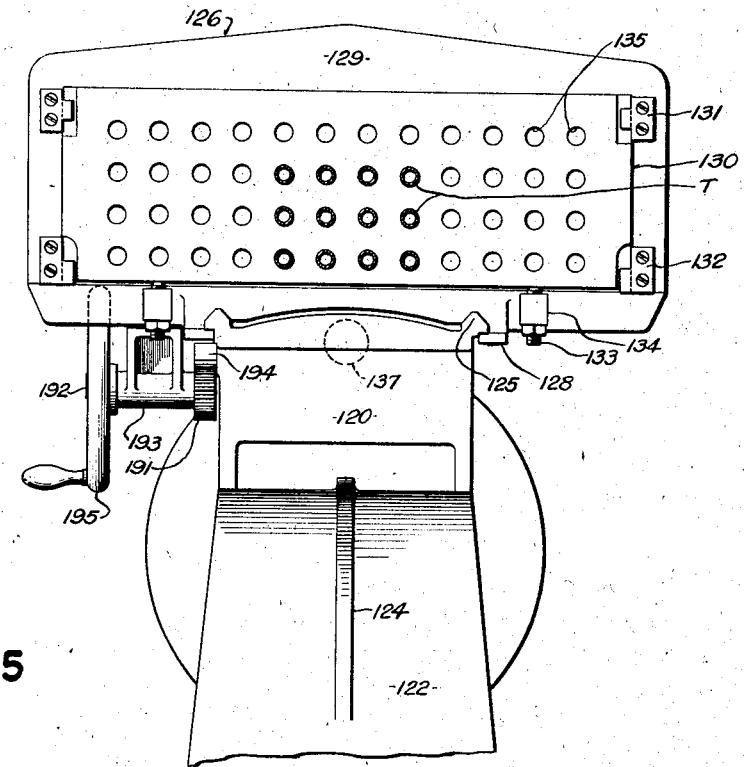
Fig. 15 is an end elevation of the tube end of the tube positioning unit.

The machine, as shown in Figs. 1 and 2, comprises generally a fin applying unit 20 and a tube positioning unit 21, the former including an endless conveyor system for carriages 22, which are loaded manually at the right hand end of the machine, each receiving a fin F, which is subsequently forced upon spaced tubes T. Common ends of the tubes are positioned in the unit 21, which unit, as hereinafter described, intermittently moves the tubes to the left and determines the spacing of the fins on the tubes.

In Fig. 16 it will be observed that the fins F are formed with flanged openings O which are capable of resiliently engaging about the tubes T. Inasmuch as the internal diameter of the flange is slightly less than the diameter of the tube, it has been found expedient to provide each tube with pointed mandrels 23 or 24 which insure the entry of the tubes in the flanges without rupture of the metal.

The fin supply is disposed on a feed table S at the right hand end (Fig. 2) of the machine where they are strung on a pair of feed rods R. The extremities of the rods are removably mounted in brackets 30 on the table whence they extend through flange openings in the fins and over the fin applying unit of the machine. Two of the tube mandrels 24 are longer than the remaining mandrels 23, and they are of tubular construction (Fig. 17), permitting the rods to be slidably received therein and projected thence through the accompanying tubes for nearly the length of the fin applying unit. With this arrangement the fins may be manually fed along the rods to a position where they each are engaged by a carriage 22 and conveyed in the direction of the mandrels for subsequent application on the tubes as hereinafter described.

The fin applying unit, which will be first described, is supported on three pairs of pedestals 25, 26 and 27, the former being provided with bearings 28 for receiving a driven shaft 29 having large sprockets 31 keyed thereto. The pedestals 27 are formed to receive slidable bearings 32 which are longitudinally adjustable by means of screws 33 and in which is journalled an idler shaft 34. The shaft 34 likewise carries spaced sprockets 35 which cooperate with the sprockets 31 to receive endless chains 36 of the roller type.

A suitable drive mechanism is provided for the chains comprising a reducing gear mechanism 37 operated by a motor 38 and terminating in a shaft 40. A drive sprocket 39 is keyed to the shaft 40, and it is connected by a roller chain 41 to a driven sprocket 42, which is keyed to a protruding portion of the driven shaft 29. It will be noted that the direction of movement of the driven shaft is counterclockwise (Fig. 2) so that the upper reaches or sections of the chains, as indicated by the numeral 43, move toward the tube unit.

The carriages 22 are transversely positioned between the chains and are each mounted for movement therewith by means of a shaft 44 which extends through lugs 45 thereof. The ends of each shaft protrude from the lugs and extend through bearings 46 in the links of the chain 36, guide rollers 47 or 48, and a crank arm 49. It will be observed that the shaft is keyed to both the carriage lugs 45 and the crank arms 49, while it is rotatably journalled in the chains 36 (Figs. 3 and 5). Each carriage is formed with an upright portion 50 to which is secured a platen 51 containing spaced tube clearance notches 52. As the carriages move horizontally with the upper sections 43 of the chains, the lower extremities of the notches support the lower bank of tubes and retain them in a horizontal position (Fig. 3). At the feed end of the machine, where the carriages move radially with the sprockets 35, it will be seen that a pair of notches receives the feed rods R with ample clearance so that the individual fins F on the rods may be successively engaged by the platen 51 of the moving carriages and conveyed therewith (Fig. 6).

The carriage is also formed with a tail portion 55 to which is secured a block 56 having a roller 57 mounted therein by a pin 58. As more clearly shown in Fig. 7, the block is secured by screws 59 and 61 which extend through suitable slots therein. Vertical adjustment of the block is attained by a screw 62 mounted in a strap 63 on the tail and vertically engaging the top of the block. A follower insert 65 is mounted in a slot 66 in the block 56 by studs 67, and it is also engaged by a vertical screw 68, whereby its vertical position relative to the roller may be varied to a slight degree.

The carriages occupying the lower reaches or sections 71 of the chain are permitted to swing freely in their pivotal mounting between the chains. These portions of the chains, however, are supported by longitudinal guide rails 72 which are carried by suitable brackets 73 secured to the pedestals 25, 26 and 27. The carriages occupying all other portions of the chains, however, are guided accurately, for example, following a particular carriage as it leaves the lower reaches and enters the arcuate path of the idler sprockets 35; it will be observed that a semi-circular track 75 is positioned on the shaft 34, which, during the transitional movement of the carriage, is engaged by the tail roller 57. The track is formed with a hub portion 76 through which the shaft extends. Collars 77, secured to the shaft, retain the track in its central position.

A fin F is engaged by the platen 51 during this movement, and the carriage later arrives at the upper, horizontal, reaches of the chain where the platen is maintained in a vertical position for the remainder of its horizontal travel. A horizontal rail 78 (Fig. 6) extends along the medial line of the machine, and it is supported on cross beams 79, 81 and 82 mounted between the pedestals 25, 26 and 27, respectively. This track in effect, is a horizontal continuation of the circular track 75, and it is connected to it by a coupling 83, which is bolted to the track 75. The coupling is formed with a projecting portion 84, which is slidably received in the forked end 85 of the rail 78, and it is secured thereto by a bolt 86, which extends through a horizontal slot 87 formed in the coupling. This telescopic structure permits the adjustment of the effective length of the track when the shafts 34 are moved by the bearing screws 33 to tighten the chains.

The front or platen ends of the carriage are also guided during this movement by means of pairs of spaced rails 89, 89a and 91, 91a, which extend between the pedestals 25, 26 and 27, and which are provided with suitable clearance holes 92 for receiving securing screws 93. Slight adjustment of the rails is provided for by vertical screws 94 located in each pedestal so that the rollers 47 and 48 may be received with slight clearance between the rails 89, 89a and 91, 91a, respectively. It will be observed that the roller 48 is flanged as indicated by the numeral 95, and the rails 91, 91a formed with complementary portions 96, 97, respectively, so that lateral guidance of the carriage is also attained (Fig. 5).

In Fig. 4 there is shown the mechanism for tilting the carriage when it approaches the end of its horizontal movement along the tracks. The central rail 78 terminates a spaced distance from the pedestals 25, and at this point it is provided with a raised insert 98 (Figs. 3 and 4), which is slidably engaged by the follower insert 65 of the carriage during transit, thus relieving the tail roller 57 of the weight of the tail portion. Obviously, upon reaching the extremity of the rail 78, the inserts disengage, and the carriage is then free to swing clockwise about the pivotal connection on the chains, with the platen 51 moving from its previous vertical position. It is intended, however, to control this gravitational movement through the medium of the cranks 49 so that it is accelerated at the beginning of the drop and decelerated as the platen approaches a horizontal position to prevent unnecessary oscillation.

This control mechanism (Figs. 4 and 5) consists of a box cam 100, secured in a recessed portion 101 of each pedestal 25 and formed of cam plates 102 and 103. A cam roller 104 is mounted on the extremity of each crank arm 49, and the plates 102 and 103 are positioned directly in the path thereof, the roller passing over the upper surface 105 of the plate 103 and engaging the vertical surface 106 of the plate 102. The cam groove 107 which is formed between the plates, and of which the surface 106 is a part, curves downward and outward toward the tube positioning unit. In this locale the shaft 44 is conveyed radially with the sprockets 31, and the chain bearings 46 thus become the pivots about which the crank arms 49 operate at a rate of movement determined by the curvature of the cam groove 107.

To assure the accurate translation of movement of the cam rollers 104 from the horizontal to the vertical, they are caused to pass over spring pads 108 which are each mounted for vertical movement in a slot 109 in the cam plate 103 (Fig. 5). These members are formed with angular surfaces 111 over which the rollers 104 pass, thus causing their depression into the slots 109 against the thrust of springs 112. After the passage of the rollers, the pads 108 immediately are restored to their elevated position and thus prevent retrograde movement of the rollers, which might otherwise be occasioned as the result of their impact with the plate 102.

The path of movement of the tail roller of the carriage is indicated by the dotted line 113 in Fig. 4, and an intermediate position of the carriage is similarly shown, where it will be noted that shaft 44 follows its fixed radial path with the sprockets 31, while the cam roller 104 is drawn thereby through the cam groove 107, as indicated by the numeral 114.

Upon leaving the zone of the cams 100 the carriage assumes its inverted position on the lower reaches of the chains preliminary to the recurrence of the cycle described.

The tube positioning unit 21, which determines the spacing of the fins, is disposed adjacent the pedestals 25, and it includes an elongated bed 120 mounted on legs 121 and 122, and connected to the pedestals 25 by brackets 123. The leg 122 is formed with a curved cam portion 124 which cooperates with the previously described control cam mechanism for the carriages 22 by guiding the tail rollers 57 (Fig. 4) to prevent violent swinging of the carriages.

The bed is formed with parallel rails 125 on which a saddle 126 is mounted for longitudinal movement by means of slide bearings, which include grooves 127 complementary with the rails and strips 128 secured to the saddle. The saddle is formed with a vertically disposed bracket portion 129 to which a thrust plate 130 is secured by means of finger pieces 131 and 132 (Fig. 15). Vertical adjustment of the plate is attained by adjusting screws 133 which are mounted in tapped lugs 134 on the saddle 126. The plate 130 serves as a mounting for one end of the tubes T which are engaged in spaced sockets 135 located therein, the spacing of the sockets being identical to the spacing of the flanges in the fins F.

The saddle is driven rearward in intermittent movements timed to occur immediately after each of the carriages 22 enters into its translatory movement as previously described. The mechanism for effecting the movement of the saddle includes a screw 137, which is mounted longitudinally in the bed 120 in radial bearings 138 and also provided with thrust bearings 139 which bear against the face of the bearings 138. A split nut 140, which will hereinafter be more fully described, is secured to the saddle, and it engages the screw 137; thus, it will be apparent that rotation of the screw will produce the movement of the saddle along the rails 125.

The extremity 142 of the screw 137 receives a pinion 143, which in turn meshes with a gear 144, having a hub portion 145, which is rotatably mounted on a stationary shaft 146. A gear casing 147 encloses the pinion and gear, and it is secured to the bed 120 and pedestal 121 (Figs. 8 and 9). A coupling 148 is secured to the gear hub 145, and it protrudes from the casing where it receives a ratchet wheel 149, which is secured thereto.

Bell cranks 150 and 151 are likewise rotatably mounted on the fixed shaft 146, and they are each provided with a pawl 152 and a pivot block 153 secured to their separate arms. The pawls 152 engage the ratchet wheel for driving action in a clockwise direction as viewed in Fig. 9, and they are urged into engagement by a spring actuated plunger 154, suitably mounted in each crank, and each having a head 155 engaging a cam surface 156 on the pawl (Fig. 11). Inasmuch as the surface 156 is inclined relative to the head 155, the thrust it receives causes the rotation of the pawl into operative position with the wheel 149.

A gear box 157 is secured to the leg 121 (Figs. 10 and 11), and it contains similar ratchet drive gears 158, connected by a pinion 159, one gear being keyed to a shaft 160 journalled in bearings 161 and 162 in the box structure, and the remaining gear keyed to a stub shaft 163 journalled in a bearing 164. The pinion 159 is rotatably mounted on a stud 165. The shafts 160 and 163 protrude from the box and receive crank discs 166 and 167 formed with radial slide bearings 168 and 169, respectively (Figs. 8 and 9).

Figure 12:
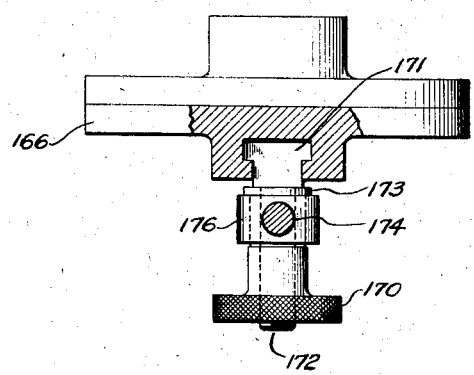
Fig. 12 is a section on the line 12—12 of Fig. 9.

The slide bearings each receive an adjustable slide 171, having a protruding stem 172 for receiving a shouldered clamp 173 and a nut 170 (Fig. 12). Each slide is connected to one of the arms of the bell cranks 150 and 151 by connecting rods 174 and 175, respectively. These rods are formed with eyes 176 and 177, respectively, which rotatably engage the shouldered clamp 173 of each slide, and their remaining extremities are slidably received in the pivot blocks 153 where they are fixed by set screws 179.

The train of mechanism leading from the gears 158 to the screw 137 is driven from the shaft 40 (Figs. 1 and 8) by means of a gear connection 180 with the shaft 160. For the present purposes the gear ratio is calculated so that upon each passage of a carriage 22 through a fixed point, the ratchet drive gears 158 make one-half of a complete revolution, and correspondingly, one complete stroke of each rod 174 and 175 is attained during a complete revolution of the gears 158. As a result, the pawls 152 engage and move the ratchet wheel 149 and attached gear 144 a fractional degree determined by the length of each rod stroke, and this movement is in turn imparted to the screw 137 through the pinion 143 to the end that the saddle 126 is caused to move rearward on its rails 125.

It will be observed that the driving strokes of the rods 174 and 175 occur at 180° intervals due to the positioning of the slide bearings 168 and 169; thus, as each carriage 22 passes its cam mechanism, the screw 137 is actuated by a rod stroke, the strokes being timed to occur alternately, one stroke per each passage of a carriage.

Figure 14:
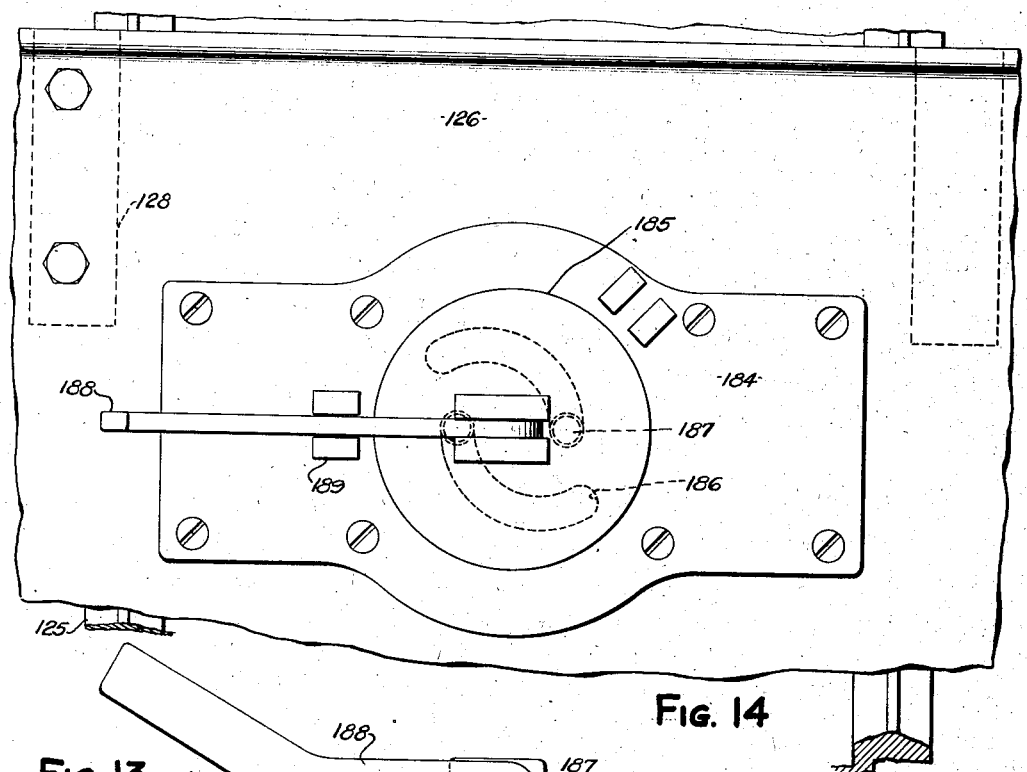
Fig. 14 is a fragmentary plan view on an enlarged scale of the saddle nut lock mechanism.
Figure 13:
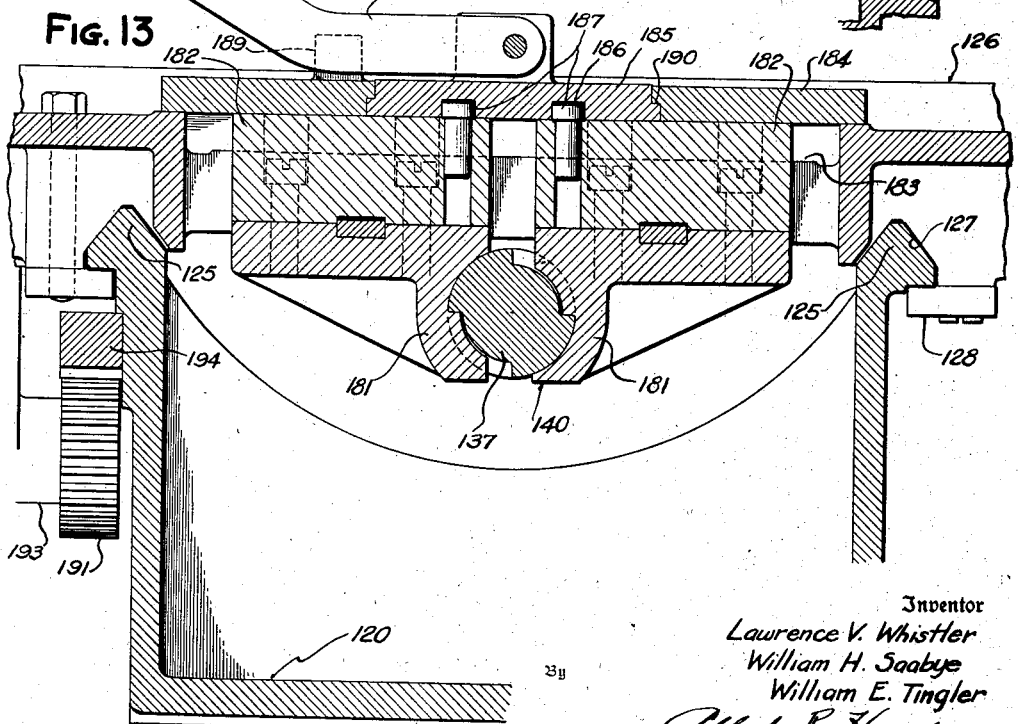
Fig. 13 is an enlarged fragmentary section on the line 13—13 of Fig. 8.

Due to a possible variety of starting positions for the saddle 126, it has been found expedient to provide means for detaching it from the screw 137 so that it may be positioned at any suitable station along the rails 125 prior to reengaging the screw for operation. Thus, as shown in Figs. 8, 13 and 14, the nut 140 is formed of halves 181 which are secured to guides 182, which in turn are mounted for transverse sliding movement on guide rails 183 formed in the saddle structure. A plate 184 is secured to the saddle immediately above this structure, and it is formed with a shouldered circular bearing 190, which receives a complementary lock disc 185. The disc is formed with helical grooves 186 which each engage a pin 187 secured in the guides, and it additionally is provided with a handle 188.

In the position shown in Figs. 13 and 14, the halves of the nut 140 are in their operative position in engagement with the screw 137, and with the disc 185 locked against rotation by the engagement of its handle 188 between lugs 189.

To release the nut from the screw, the handle 188 is disengaged from the lugs 189, and the disc 185 is then rotated thereby, whereupon the halves 181 are caused to separate by the action of the disc grooves 186 on their pins 187. The saddle is then freely movable along its rails, such movement being rendered more convenient by a gear and rack connection between the bed 120 and the saddle 126, the gear 191 being mounted on a shaft 192 journalled in a bracket 193 which is secured to the saddle, and the rack 194 being secured to the side of the bed 120. A handwheel 195 is fixed to the shaft 192 for operating the same.

In the general operation of the machine, it will be seen that after properly positioning the saddle 126 on the rails 125, the ends of the tubes T are inserted in the plate sockets 135 and projected, as shown in Fig. 1, through the aligned clearance notches 52 of the carriages 22, with their remaining extremities supplied with the previously described mandrels 23 and 24. The rods R, bearing their supply of fins, are telescopically engaged through the mandrels 24 and the accompanying tubes. Upon starting the machine, the fins are individually fed along the rods into the path of the carriages, by which means they are conveyed toward and successively transfixed by the mandrels which pass through each flange opening O. Still retained by the carriages, the fins are forced to slide along the tubes to the limit of the horizontal movement of the carriages, at which location (Fig. 4) the carriages tilt backward, thus releasing themselves from the fins, and then slide under the tube and fin assembly under the influence of the control cams 100.

Immediately following the tilting movement of each carriage, the saddle 126 is caused to move rearward a slight distance through the action of one crank disc and the associated ratchet mechanism on the screw 137. The tubes T, at all times being thrust against the thrust plate 130 of the saddle, likewise move rearward and carry with them the fins previously positioned. The rate of this intermittent movement is somewhat less than the speed of the advancing carriages so that there is no possibility of disturbing the fins still positioned in the carriages.

Thus, when the succeeding fin, conveyed by its respective carriage, reaches its limit of horizontal movement, the previously conveyed fin is spaced from it a distance equal to the movement of the saddle 126. This action is continued with the crank discs 166 and 167, alternately causing the step by step retreat of the saddle, until the mandrel extremities of the tubes approach the vicinity of the pedestals 25, whereupon the machine is stopped and the completed fin and tube assembly lifted from the machine, the saddle of which is then repositioned to receive a new set of tubes.

With the saddle control mechanism set as shown, the strokes of the connecting rods 174 and 175 are equal, thus each retreating movement of the saddle is of equal distance, and the fins are correspondingly equally spaced (Fig. 17). Should it be desired to provide a coil with staggered fins as shown in Fig. 18, the rods 174 and 175 are given different strokes through the adjustment of the slides 171 in the crank discs 166 and 167, in which case the saddle is alternately moved different distances corresponding to the movement of the screw 137.

The machine may readily be conditioned to assemble fins and tubes of different proportions or tube spacing from that shown by substituting a new set of platens 51 and a new platen 130 on their carriages 22 and saddle 126, respectively. As will be readily understood by those skilled in the art, these and other changes, which may be occasioned by the physical characteristics of the fins and tubes, may be resorted to without departing from the inventive concept as set forth in the following claims.

We claim:

1. An assembling machine for applying fins on tubes comprising a rail structure, an endless conveyor at one end of said structure and having a lineally disposed section, spaced pairs of bearings on the conveyor, a shaft journalled in each pair of bearings, a carriage secured to each shaft and having a platen portion for receiving a fin, a crank secured to each shaft, fixed guide tracks adjacent the conveyor for guiding the carriages on said section with their platens disposed in a perpendicular position relative to said section, said guide tracks terminating adjacent to the rail structure, fixed cam means at the end of said tracks engageable by the crank in transit and causing it and the accompanying carriage to rotate in a direction away from the rail structure, a saddle slidably mounted on the rail structure and formed with means for engaging one end of a tube with remaining portions of the tube disposed over the conveyor section and in the path of the fins on the carriages thereon, said carriages forcing the fins on the tubes during their lineal movement, and a mechanism operated by said drive means for intermittently moving said saddle away from said section as each carriage is rotated by the fixed cams.

2. An assembling machine for applying fins on tubes comprising a rail structure, an endless conveyor at one end of said structure and having a lineally disposed section, spaced carriages on the conveyor, drive means for operating the conveyor in a direction wherein the carriages on said section approach the rail structure, means on each carriage for positioning a fin transversely of the conveyor, a saddle slidably mounted on the rail structure and formed with means for receiving one end of a tube with remaining portions of the tube disposed over the conveyor section and in the path of the fins on said carriages, a mandrel secured to the free end of the tube and formed with an axial opening, a guide rod having one extremity telescopically received in the mandrel opening and accompanying tube and its remaining extremity projecting beyond the conveyor, a table having means for positioning the last named end of said rod, said table being adapted to receive a supply of fins, said fins being strung on said rod and being adapted to be fed thereon into the proximity of said carriages for movement therewith, said carriages during their lineal movement forcing the fins over the mandrel and on the tube, and a mechanism for moving the saddle intermittently on its rail structure away from the conveyor section, said mechanism being operated by the conveyor drive means as each carriage completes its lineal movement with said conveyor section.

3. An assembling machine for applying fins on tubes comprising a rail structure, an endless conveyor at one end of said structure and having a lineally disposed section, spaced carriages on the conveyor, drive means for operating the conveyor in a direction wherein the carriages on said section approach the rail structure, means on each carriage for positioning a fin transversely of the conveyor, a saddle slidably mounted on the rail structure, a thrust plate secured thereto and formed with sockets for receiving the common extremities of a plurality of tubes, the remaining portions of the tubes being disposed over the conveyor section and in the path of the fins on said carriages, a mandrel inserted in the remaining extremities of each tube, certain of said mandrels having axial openings therein, a rod telescopically received in each of said last named mandrels and having one end projecting into the tube thereof and its remaining end projecting beyond the conveyor section, stationary mounting means for said last named ends of the rods, said rods having a supply of fins strung thereon, said fins being adapted to be fed along said rods into the proximity of said carriages for movement therewith, said carriages during their lineal movement forcing the fins over said mandrels and on said tubes, and a mechanism for moving the saddle intermittently on its rail structure away from the conveyor section, said mechanism being operated by the conveyor drive means as each carriage completes its lineal movement with said conveyor section.

4. An assembling machine for applying fins on tubes comprising a rail structure, an endless conveyor at one end of said structure and having a lineally disposed section, spaced carriages on the conveyor, drive means for operating the conveyor in a direction wherein the carriages on said section approach the rail structure, means on each carriage for positioning a fin transversely of the conveyor, a saddle slidably mounted on the rail structure and formed with means for receiving one end of a tube with remaining portions of the tube disposed over the conveyor section and in the path of the fins on said carriages, said carriages forcing the fins on the tube during their lineal movement, and a mechanism for moving the saddle intermittently on its rail structure away from the conveyor section, comprising a screw rotatably mounted in the rail structure, a nut mounted on the saddle and engaging said screw, a drive mechanism for the screw including a ratchet mechanism, a plurality of adjustable crank means each having an operative connection with said ratchet mechanism, a common drive mechanism for the crank means operated by said conveyor drive means, said crank means being set to operate the ratchet mechanism alternately as each carriage completes its lineal movement with said conveyor section.

5. In a machine for assembling apertured fins on tubes including means for holding the tubes and means for moving fins longitudinally of the tubes, a plurality of rods disposed lengthwise of said fin moving means, means adapted to receive and secure said rods at the ends thereof remote from said tube holding means, said rods being of such diameter and length as to pass through the apertures formed in said fins and into the open ends of tubes mounted on said tube holding means, whereby during assembly the fins are supported on said rods and independently of said fin moving means.

6. An assembling machine for applying fins transversely on tubes comprising movable tube supporting means, an endless conveyor having a lineally disposed section disposed beneath the tubes, carriages pivotally connected to the conveyor at spaced intervals, each carriage having a platen for receiving a fin, fixed guide tracks slidably engageable by the platens on said section for retaining the platens in perpendicular position relative to said section, said platens having portions extending between said tubes, said guide tracks terminating adjacent to one end of the section where the carriages are released for free pivotal movement on the conveyor, fixed abutment means engageable by each carriage as it leaves said tracks for causing the rotation of the carriage on said conveyor whereby the platen portion thereof is swung out of registry with the tubes and fins, cam means associated with said abutment means, roller means on each carriage engageable in said cam means to guide each carriage during swinging movement, and drive means for moving the tube supporting means and conveyor in timed relation.

7. In a machine for assembling fins on tubes, means for moving fins longitudinally of the tubes, drive means therefor, tube holding means disposed adjacent to said first means and comprising a rail structure, a saddle slidably mounted on the rail structure and formed with means for holding one end of a tube, a mechanism for moving the saddle on the rail structure away from said first means comprising a screw rotatably mounted in the rail structure, a nut mounted on the saddle and engaging said screw, a drive mechanism for the screw including a ratchet mechanism, a plurality of adjustable crank means each having an operative connection with said ratchet mechanism, a common drive mechanism for the crank means, and means for operating said drive mechanism in timed relation to said drive means, said crank means being set to operate the ratchet mechanism alternately.

LAWRENCE V. WHISTLER.
WILLIAM H. SAABYE.
WILLIAM E. TINGLER.